United States Patent
Oemke et al.

(10) Patent No.: US 8,601,798 B2
(45) Date of Patent: Dec. 10, 2013

(54) PARTICULATE FILTER REGENERATION PROCESS DIAGNOSTIC

(75) Inventors: Rebecca A Oemke, Plymouth, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 13/045,629

(22) Filed: Mar. 11, 2011

(65) Prior Publication Data

US 2012/0227381 A1    Sep. 13, 2012

(51) Int. Cl.
  *F01N 3/00* (2006.01)
  *F01N 3/02* (2006.01)
(52) U.S. Cl.
  USPC .................................. 60/295; 60/277; 60/311
(58) Field of Classification Search
  USPC .................................... 60/277, 295, 297, 311
  See application file for complete search history.

(56) References Cited

U.S. PATENT DOCUMENTS

| | | | |
|---|---|---|---|
| 2003/0106306 A1* | 6/2003 | Nakatani et al. | 60/288 |
| 2005/0150211 A1 | 7/2005 | Crawley et al. | |
| 2010/0300075 A1* | 12/2010 | Gonze et al. | 60/286 |
| 2011/0000193 A1 | 1/2011 | Paterson et al. | |

FOREIGN PATENT DOCUMENTS

| | | |
|---|---|---|
| DE | 102005042843 A1 | 11/2006 |
| DE | 102010032545 A1 | 2/2011 |
| FR | 2929645 A1 | 10/2009 |

* cited by examiner

*Primary Examiner* — Kenneth Bomberg
*Assistant Examiner* — Audrey K Bradley
(74) *Attorney, Agent, or Firm* — Quinn Law Group, PLLC

(57) ABSTRACT

A system for the treatment of exhaust gases includes an engine, an exhaust system, and a controller. The exhaust aftertreatment system is configured to accept exhaust gas from the engine and includes a particulate filter configured to filter particulate matter from the exhaust gas. A controller is configured to determine an actual temperature of the particulate filter during a regeneration process and analyze the actual temperature relative to a temperature deviation threshold. The controller is configured to adjust the temperature deviation threshold in real time based, at least in part, on an operating condition of the engine and a mass flow of the exhaust gas.

18 Claims, 1 Drawing Sheet

PARTICULATE FILTER REGENERATION PROCESS DIAGNOSTIC

TECHNICAL FIELD

The disclosure relates to a diagnostic for a particulate filter regeneration process.

BACKGROUND

Passenger and commercial vehicles that use diesel engines may use a diesel particulate filter (DPF), a diesel oxidation catalyst (DOC), or both, to reduce emissions caused by exhaust gases. The diesel particulate filter is used to filter soot from the exhaust gases, while the diesel oxidation catalyst oxidizes the exhaust gases to reduce emissions. A regeneration process is used to remove the soot that collects on the diesel particulate filter.

SUMMARY

An example system includes an internal combustion engine, an exhaust aftertreatment system, and a controller. The exhaust aftertreatment system is fluidly coupled to an exhaust port of the engine and is configured to accept exhaust gas flow from the engine. The exhaust aftertreatment system includes a particulate filter configured to filter particulate matter from the exhaust gas. A controller is in communication with at least one of the engine and the exhaust aftertreatment system. The controller is configured to determine an actual temperature of the particulate filter during a regeneration process and analyze the actual temperature relative to a temperature deviation threshold. The controller is further configured to adjust the temperature deviation threshold in real time based at least in part on an operating condition of the engine and a mass flow rate of the exhaust gas.

An example method includes determining, via a computing device, a temperature deviation threshold in real time during a regeneration process. The temperature deviation threshold may be based, at least in part, on an operating condition of an engine, a mass flow of exhaust gases, or both. The method further includes determining an actual temperature of a particulate filter, calculating a deviation temperature defined as a difference between the actual temperature and a desired temperature, comparing the deviation temperature to the temperature deviation threshold, and identifying a fault condition if the deviation temperature exceeds the temperature deviation threshold.

The above features and the advantages of the present disclosure are readily apparent from the following detailed description of the best modes for carrying out the invention when taken in connection with the accompanying drawings.

DETAILED DESCRIPTION

As described in greater detail below, a system has a controller that is able to compensate for changes in operating conditions of the system in real time during a regeneration process. That is, the controller may define a temperature deviation threshold that includes an appropriate temperature range of a particulate filter during the regeneration process. When used in a vehicle, certain operating conditions such as the vehicle speed, mass flow or change in mass flow of the exhaust gas, etc., may affect the temperature of the particulate filter in the exhaust system during the regeneration process. While these changes in the temperature may push the temperature of the particulate filter beyond the temperature deviation threshold, such changes in temperature do not necessarily indicate that the regeneration process has failed. Accordingly, the controller is able to compensate for changes in the operating conditions of the vehicle in real time during the regeneration process by, e.g., adjusting the temperature deviation threshold so that temperature changes caused by the operating conditions of the vehicle are not incorrectly characterized as failures of the regeneration process. The system may take many different forms and include multiple and/or alternate components and facilities. While an example system is shown in the Figures, the components illustrated in the Figures are not intended to be limiting. Indeed, additional or alternative components and/or implementations may be used. For example, although the system is described in the context of a regeneration process used with a diesel engine, the system may be used during a regeneration process of any type of direct injection fuel system.

Figure 1:
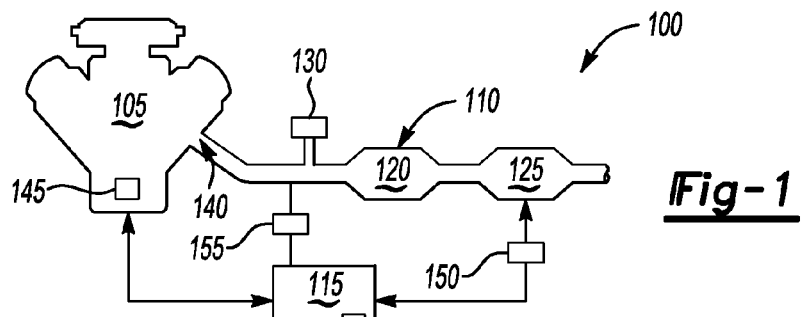
FIG. 1 is a schematic diagram of an example system configured to reduce emissions from exhaust gases and implement a regeneration process.

FIG. 1 illustrates an example system 100 that includes an engine 105, an exhaust aftertreatment system 110, and a controller 115. The system 100 may be used in a vehicle, such as any passenger or commercial automobile, aircraft, train, bus, truck, motorcycle, etc. The system 100 may alternatively be used in other applications where, e.g., a regeneration process is used to remove soot from the exhaust system 110.

The engine 105 may include any device configured to generate motion from a fuel. For instance, the engine 105 may be a compression-ignition (e.g., diesel) engine configured to combust diesel fuel. In one possible approach, the engine 105 may include a piston (not shown) disposed within a chamber (not shown). The piston may compress the fuel inside the chamber when the piston is near a top dead center position, and the compression of the fuel may cause the fuel to combust. The energy released during combustion may force the piston toward a bottom dead center position within the chamber. The translating motion of one or more pistons in the engine 105 between the top dead center position and the bottom dead center position may cause a crankshaft (not shown) connected to the pistons to rotate. The rotation of the crankshaft may generate a torque that can be used to propel the vehicle. The engine 105 may combust the fuel according to any thermodynamic cycle, such as the Diesel cycle. The combustion process may release exhaust gas that may flow from the engine via an exhaust port 140. An engine control unit 145 may be configured to generate control signals that control the operation of the engine 105.

The exhaust aftertreatment system 110 may include any number of devices in fluid communication with the exhaust port 140 and configured to receive exhaust gas from the engine 105. That is, the engine 105 may generate exhaust gases as part of the combustion process described above. The exhaust system 110 may include, e.g., tubing or pipes that connect to the exhaust port 140 and guide the exhaust gases out of the engine 105. The exhaust system 110 may further include various components that may be used to reduce emissions caused by the exhaust gases. For instance, the exhaust system 110 may include an oxidation catalyst 120 and a particulate filter 125. The oxidation catalyst 120 may include any device, such as a diesel oxidation catalyst (DOC), configured to use a chemical process to break down compounds in the exhaust gases. The oxidation catalyst 120 may use a catalyst such as palladium and/or platinum to reduce the particulate matter, hydrocarbon-based soluble organic fraction (SOF), and carbon monoxide content of exhaust gas by oxidation. The particulate filter 125 may include any device, such as a diesel particulate filter (DPF), configured to filter particulate matter or soot from the exhaust gas.

During operation of the engine 105 and the exhaust system 110, particulate matter may collect on the particulate filter 125 and limit the ability of the exhaust system 110 to reduce emissions and/or allow exhaust gas to flow out of the engine 105. Thus, a regeneration process may be used to remove the particulate matter so that the particulate filter 125 may continue to filter the exhaust gas. The regeneration process may include increasing the temperature of the particulate filter 125 to a level sufficient to burn off the collected particulate matter. Accordingly, in one possible implementation, the regeneration process may include injecting hydrocarbons into the oxidation catalyst 120 using an injector 130. As the hydrocarbons oxidize, heat is generated. The heat generated by the oxidation catalyst 120 plus the heat of the exhaust gas may increase the temperature of the particulate filter 125 to a level sufficient to burn off the particulate matter collected on the particulate filter 125. Other regeneration techniques may be used in addition or as an alternative to the regeneration process described above.

The controller 115 may include any device configured to determine whether the regeneration process was properly executed based on the temperature of the particulate filter 125. For instance, the controller 115 may be configured to determine and analyze the actual temperature of the particulate filter 125 during the regeneration process. If the actual temperature is too low or too high, the controller 115 may identify a fault condition indicating that the regeneration process did not execute properly or could damage the components of the exhaust system 110. If, however, the actual temperature is deemed appropriate, the controller 115 may determine that the regeneration process executed properly.

The controller 115 may measure the actual temperature, or alternatively, derive the actual temperature from, e.g., a temperature signal. For instance, the system 100 may include a temperature sensor 150 in communication with the controller 115 and configured to measure the actual temperature of the particulate filter 125. The temperature sensor 150 may be configured to generate a temperature signal representing the actual temperature measured, and the controller 115 may be configured to receive the temperature signal and determine the actual temperature of the particulate filter 125 based on the measured temperature as represented by the temperature signal.

To analyze the actual temperature of the particulate filter 125, the controller 115 may be configured to determine a desired temperature, a temperature deviation threshold, and a deviation temperature. The desired temperature may be one of many temperatures between a temperature that is sufficient to burn the particulate matter off of the particulate filter 125 and a temperature that minimizes the risk of heat damage to the components of the exhaust system 110. The temperature deviation threshold may be used to define a range of temperatures at which the regeneration process will work properly. That is, the temperature deviation threshold may define an acceptable amount of deviation from a desired temperature that will allow regeneration to occur. The temperature deviation threshold may be based, at least in part, on the desired temperature, a maximum temperature that is above the desired temperature, and a minimum temperature that is below the desired temperature. The minimum temperature may be equal to or above the lowest temperature sufficient to burn the particulate matter. The maximum temperature may be equal to or below the highest temperature that one or more components of the exhaust system 110 can withstand without a significant risk of heat damage. The temperature deviation threshold, therefore, may be substantially equal to a difference between the maximum temperature and the desired temperature or a difference between the desired temperature and the minimum temperature. The deviation temperature may be defined as a difference between the actual temperature of the particulate filter 125 and the desired temperature of the particulate filter 125. The controller 115 may be configured to identify a fault condition indicating that the regeneration process did not execute properly if the deviation temperature exceeds the temperature deviation threshold.

In some instances, the difference between the maximum temperature and the desired temperature may be equal to the difference between the desired temperature and the minimum temperature. However, it is possible that the difference between the maximum temperature and the desired temperature may define a first temperature deviation threshold that is different from a second temperature deviation threshold defined by the difference between the desired temperature and the minimum temperature. In this instance, the controller 115 may be configured to compare the deviation temperature to the first temperature deviation threshold if the actual temperature is above the desired temperature, and compare the deviation temperature to the second temperature deviation threshold if the actual temperature is below the desired temperature.

The controller 115 may be configured to access and/or derive the desired temperature, the maximum temperature, and the minimum temperature from values in a look-up table. The look-up table may include a calibration temperature and a calibration temperature range associated with various operating conditions of the engine 105. The controller 115 may be configured to select the appropriate calibration temperature and calibration temperature range given the operating conditions of the engine 105, set the calibration temperature as the desired temperature, and apply the calibration temperature range to the desired temperature. Using the calibration temperature range, the controller 115 may be configured to derive the maximum and/or minimum temperatures that, at least partially, define the temperature deviation threshold.

By way of example, the calibration temperature may indicate a desired temperature of 600 degrees Celsius and the calibration temperature range may provide for a temperature range of 100 degrees Celsius. Accordingly, the controller 115 may be configured to initially identify the maximum temperature as 650 degrees Celsius and the minimum temperature as 550 degrees Celsius. Both the first and second temperature deviation thresholds in this example are 50 degrees Celsius. However, it is possible for the first and second temperature deviation thresholds to be different if, e.g., the calibration temperature range is not centered about the desired temperature.

The controller 115 may be further configured to recognize that various conditions, such as an operating condition of the engine 105 or an amount of mass flow of the exhaust gas through the exhaust system 110, may affect the temperature of the particulate filter 125 in a way that increases or reduces the actual temperature of the particulate filter 125 above the maximum temperature or below the minimum temperature. Since such an increase or reduction would cause the controller 115 to falsely identify the fault condition, the controller 115 may be configured to adjust the temperature deviation threshold in real time during the regeneration process based, at least in part, on the operating condition of the engine 105, the mass flow of the exhaust gas, or both. The controller 115 may be implemented via any number of computing devices or control modules used in, e.g., a vehicle. As such, the controller 115 may be implemented by any combination of the engine control unit 145, a transmission control unit (not shown), etc.

In one example approach, the controller 115 may be configured to determine the operating condition of the engine 105 based on, e.g., a speed of the engine 105 or the amount of torque generated by the engine 105. When the system 100 is used with a vehicle, the controller 115 may be configured to derive the speed of the engine 105 based on a speed and the current gear ratio of the vehicle. Alternatively, the speed of the engine 105 may be measured directly by measuring the rotational speed of the crankshaft of the engine 105 or derived from control signals generated by the engine control unit 145. The mass flow may be measured using one or more sensors 155 in the exhaust system 110, or alternatively, derived based on control signals generated by the engine control unit 145 that represent, e.g., the amount of fuel consumed by the engine 105. The controller 115 may be further configured to consider the change in the mass flow over time when adjusting the temperature deviation threshold.

The controller 115 may be configured to select one or more offset values based on, e.g., the operating condition of the engine 105, the mass flow of the exhaust gas, or both. Offset values associated with various conditions may be stored in a look-up table. Accordingly, the look-up table may store one or more engine condition offsets, a mass flow offsets, etc. Each engine condition offset may be associated with a condition of the engine 105, such as the vehicle speed, and each mass flow offset may be associated with the mass flow or change in mass flow of the exhaust gas. The controller 115 may select the engine condition offset based on, e.g., the speed of the engine 105 or vehicle and the controller 115 may select the mass flow offset based on, e.g., the measured mass flow or the rate of change of the mass flow over time. The controller 115 may apply the selected offsets to the calibration temperature range.

Some offset values (e.g., positive) may expand the temperature deviation threshold while other offset values (e.g., negative) may reduce the temperature deviation threshold. By way of example, at low speeds, the actual temperature of the particulate filter 125 may vary due to the low volume of exhaust gases produced by the engine 105. Thus, at low vehicle speeds, the engine condition offset might have a relatively high magnitude. As the vehicle speed increases, the large volume of the exhaust gases may cause the actual temperature of the particulate filter 125 to approach the desired temperature. Thus, the magnitude of the engine condition offset may decrease as the vehicle reaches higher speeds. Indeed, at some speeds, the engine condition offset may be equal to zero or a negative number. The mass flow offset may increase as the rate of change of mass flow through the exhaust system 110 increases, and the mass flow offset may decrease as the rate of change of mass flow through the exhaust system 110 decreases.

The offset values may be used to define the maximum and minimum temperatures that define the temperature deviation threshold. For instance, the maximum temperature may be substantially equal to the highest temperature in the calibration temperature range adjusted by one or more of the engine condition offset and the mass flow offset given the calibration temperature (e.g., the desired temperature). Similarly, the minimum temperature may be substantially equal to the lowest temperature in the calibration temperature range adjusted by one or more of the engine condition offset and the mass flow offset in light of the calibration temperature (e.g., the desired temperature). Using the example above, the calibration temperature may be 600 degrees Celsius and the calibration temperature range may be 100 degrees Celsius (e.g., centered around 600 degrees Celsius). If the magnitude of the engine condition offset is 10 degrees Celsius and the magnitude of the mass flow offset is 40 degrees Celsius, the maximum temperature may be 700 degrees Celsius and the minimum temperature may be 500 degrees Celsius. With the offsets, the temperature deviation threshold increases from 50 degrees Celsius to 100 degrees Celsius. Thus, in accordance with the operating conditions of the engine 105 and the mass flow of the exhaust gas, the controller 115 may be configured to expand or reduce the temperature deviation threshold in real time during the regeneration process.

In another possible approach, the controller 115 may be configured to adjust the maximum temperature independently of the minimum temperature. The operating conditions of the engine 105 and the mass flow of the exhaust gas may indicate that, e.g., the first temperature deviation threshold may increase while the second temperature deviation threshold may stay the same or decrease. As discussed above, the first temperature deviation threshold is defined as the difference between the maximum temperature and the desired temperature while the second temperature deviation threshold is defined as the difference between the desired temperature and the minimum temperature. Therefore, the controller 115 may be configured to individually select offset values to independently adjust the maximum temperature and/or the minimum temperature. That is, the controller 115 may be configured to select a first offset value that increases or decreases the first temperature deviation threshold and a second offset value that increases or decreases the second temperature deviation threshold.

Referring to the previous examples where the calibration temperature may be 600 degrees Celsius and the calibration temperature range may be 100 degrees Celsius, the controller 115 may select a first offset value that indicates that the maximum temperature may be increased by 50 degrees Celsius and select a second offset value that indicates that the minimum temperature may be reduced by 20 degrees Celsius. As such, the maximum temperature becomes 700 degrees Celsius, which makes the first temperature deviation threshold equal to 100 degrees Celsius, and the minimum temperature becomes 570 degrees Celsius, which makes the second temperature deviation threshold equal to 30 degrees Celsius.

In one possible approach, the offset values applied to the maximum temperature, the minimum temperature, or both, may cancel one another in a way that does not affect the maximum and/or minimum temperatures. For example, one offset value may indicate that the maximum and/or minimum temperature should be increased by 10 degrees Celsius while another offset value may indicate that the maximum and/or minimum temperature should be decreased by 10 degrees Celsius. In this instance, the offset values cancel each other out, resulting in no change to the maximum and/or minimum temperature.

In general, computing systems and/or devices, such as the controller 115, the engine control unit 145, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The look-up tables described herein may be implemented as a database, data repository, or any other type of data store that includes various kinds of mechanisms for storing, accessing, and retrieving various kinds of data, including a hierarchical database, a set of files in a file system, an application database in a proprietary format, a relational database management system (RDBMS), etc. Each such data store may be included within a computing device, such as the controller 115, employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The look-up tables described above may be stored in one or more memory device 135. Each memory device 135 may include any computer-readable medium that, as previously mentioned with respect to the controller 115, includes, e.g., non-volatile and/or volatile media. Each memory device 135 may store any number of look-up tables. While only one memory device 135 is shown in FIG. 1, the system 100 may include any number of memory devices 135. Further, while the memory device 135 illustrated is part of the controller 115, the controller 115 may be configured to access look-up tables stored in any number of internal and/or external memory devices 135.

Figure 2:
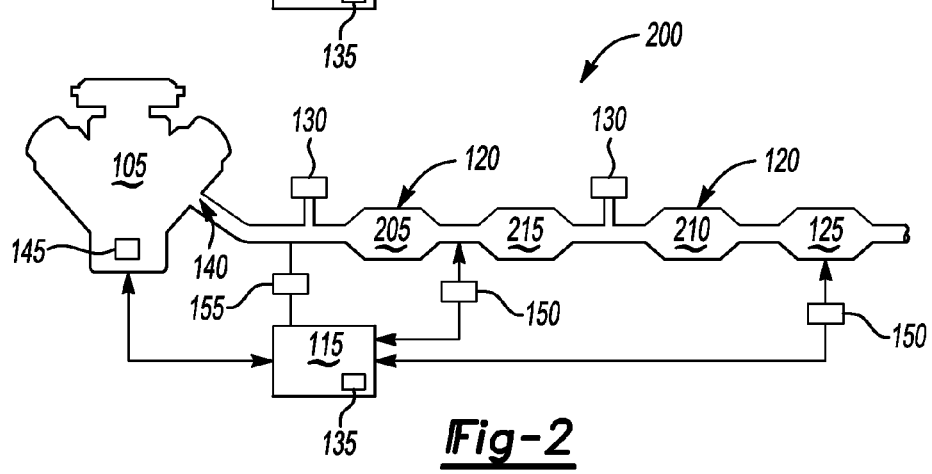
FIG. 2 is a schematic diagram of another example system configured to reduce emissions from exhaust gases and implement a regeneration process.

FIG. 2 is a schematic diagram of another example system 200 that may be used to reduce emissions from exhaust gases. Like the system 100 illustrated above with respect to FIG. 1, the system 200 illustrated in FIG. 2 may implement a regeneration process. The system 200 may include an engine 105, a controller 115, exhaust port 140, engine control unit 145, temperature sensor 150, mass flow sensor 155, and memory device 135 that are substantially the same as those described above with reference to FIG. 1. The system 200 may further include an exhaust system 110 having a first oxidation catalyst 205, a second oxidation catalyst 210, a particulate filter 125, and a catalytic reduction 215. The first oxidation catalyst 205 and the second oxidation catalyst 210 may each be substantially the same as the oxidation catalyst 120 described above with respect to the exhaust system 110 of FIG. 1. Moreover, the particulate filter 125 may be substantially the same as that previously described.

The catalytic reduction 215 may include any device, such as a selective catalytic reduction (SCR), configured to reduce emissions in exhaust gas using, e.g., a reductant and a catalyst. The reductant may include any reducing agent that donates an electron (e.g., oxidizes) during a chemical reaction. For instance, the reductant may include one or more of anhydrous ammonia, aqueous ammonia, and urea. The catalyst may include any substance that participates in a chemical reaction without being consumed during the chemical reaction. The catalyst may include, for example, titanium oxide, vanadium, tungsten, zeolites, etc. In operation, as the exhaust gas passes through the catalytic reduction 215, compounds in the exhaust gas may be converted into other compounds. For instance, Nitrous Oxide (NOx) may be converted into diatomic nitrogen ($N_2$) and water ($H_2 0$).

During the regeneration process, the first oxidation catalyst 205 and the second oxidation catalyst 210 may be used to increase the temperature of the particulate filter 125 when, e.g., provided with a fuel via injectors 130. In one possible approach, the first oxidation catalyst 205 may be configured to provide a first temperature increase and the second oxidation catalyst 210 may be configured to provide a second temperature increase that is greater than the first temperature increase. The controller 115 may be configured to monitor the first and second temperature increases using, e.g., the temperature sensors 150, and diagnose failures in the regeneration process based on those temperature increases. That is, the controller 115 may be configured to individually define and adjust temperature deviation thresholds at various locations in the exhaust system 110 and diagnose the fault in the regeneration process, as well as the location of the fault, based on the first and second temperatures in light of the temperature deviation thresholds defined for each location.

Figure 3:
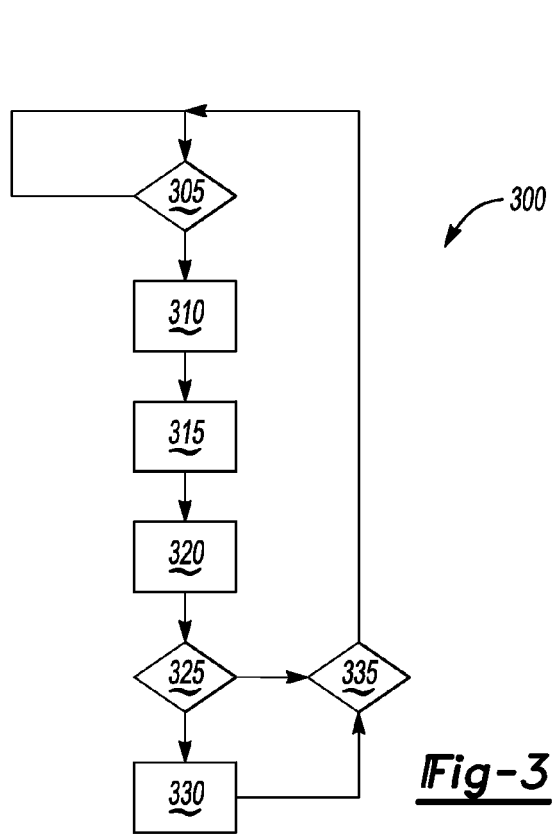
FIG. 3 illustrates a flowchart of an example diagnostic process that may be implemented by the system in real time during the regeneration process.

FIG. 3 illustrates a flowchart of an example diagnostic process 300 that may be implemented by the controller 115 in, e.g., a vehicle in real time to diagnose failures in the regeneration process.

At decision block 305, to conserve resources, the controller 115 may determine whether the regeneration process has started. If so, the process 300 may continue at block 310. If not, the process 300 may return to decision block 305 and wait for the regeneration process to begin. This way, the process 300 may only proceed during the regeneration process. Indeed, if the controller 115 determines that the regeneration process has started, the controller 115 may increment a counter to count the number of times the process 300 has been executed using the system 100.

At block 310, the controller 115 may determine, in real time, the temperature deviation threshold that may be used to define a range of temperatures at which the regeneration process will work properly. The temperature deviation threshold may define an acceptable amount of deviation from the desired temperature that will allow regeneration to occur. As discussed in greater detail below with respect to the process 400 illustrated in FIG. 4, the temperature deviation threshold may be based, at least in part, on the desired temperature, the maximum temperature, and the minimum temperature. The maximum and minimum temperature may be based on, e.g., the operating condition of the engine 105, the mass flow of the exhaust gases, etc.

At block 315, the controller 115 may determine the actual temperature of the particulate filter 125. For instance, the actual temperature may be measured by a temperature sensor 150 and communicated to the controller 115, or alternatively, the controller 115 may derive or estimate the temperature based on various factors including the operating conditions of the engine 105, the temperature of the exhaust gas provided to the particulate filter 125, the temperature of the ambient air around the exhaust system 110, etc.

At block 320, the controller 115 may calculate the deviation temperature, which may be defined as the difference between the actual temperature and the desired temperature of the particulate filter 125. The actual temperature may be measured, estimated, or derived as discussed above with respect to block 315. The desired temperature may be based on, e.g., a calibration temperature stored in a look-up table in the memory device 135.

At decision block 325, the controller 115 may compare the deviation temperature to the temperature deviation threshold to, e.g., determine whether the deviation of the actual temperature from the desired temperature is acceptable. If the deviation temperature calculated at block 320 exceeds the temperature deviation threshold determined at block 310, the process 300 may continue at block 330. If, however, the deviation temperature is within the temperature deviation threshold, the process 300 may continue at decision block 335.

At block 330, the controller 115 may identify the fault condition and take an appropriate remedial action. For instance, the controller 115 may illuminate a light indicating that the fault condition was identified and that service is required. When the system 100 is used with a vehicle, the light may be on the vehicle dashboard to warn the driver of the vehicle that the regeneration process did not execute properly. The controller 115 may not identify the fault condition each time the deviation temperature exceeds the temperature deviation threshold. Instead, the controller 115 may identify the fault condition if the deviation temperature exceeds the temperature deviation threshold for a predetermined amount of time or a consecutive number of times over a predetermined number of, e.g., key cycles or regeneration processes.

At decision block 335, the controller 115 may determine whether the regeneration process is over. If so, the process 300 may return to block 305 to wait for the next regeneration process to start. If not, the process 300 may continue at block 310 so that the temperature deviation threshold may be iteratively adjusted in real time to account for, e.g., changes in the operating condition of the engine 105 and/or changes in the mass flow during the regeneration process over time.

Figure 4:
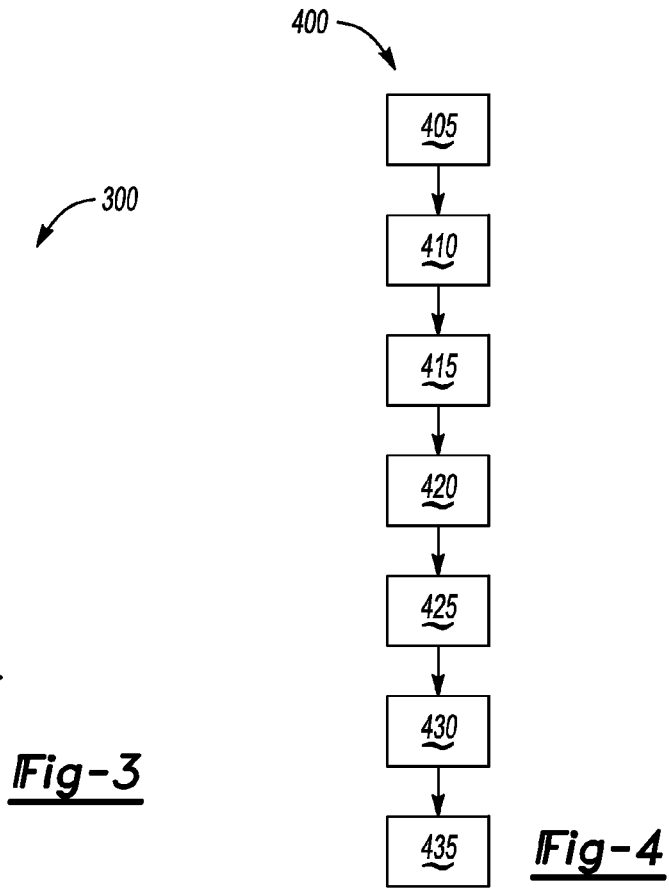
FIG. 4 illustrates a flowchart of an example process that may be used to determine a temperature deviation threshold in real time.

FIG. 4 illustrates a flowchart of an example process 400 that may be used by the controller 115 to determine the temperature deviation threshold in real time during the regeneration process. Accordingly, the process 400 or a similar process may be used at block 310 of FIG. 3. Although only one iteration is shown, the process 400 may be performed any number of times during the regeneration process to iteratively adjust the temperature deviation threshold based, at least in part, on changes in the operating condition of the engine 105 and/or changes in the mass flow during the regeneration process over time.

At block 405, the controller 115 may determine a desired temperature of the particulate filter 125. The desired temperature may be one of many temperatures between a temperature that is sufficient to burn the particulate matter off of the particulate filter 125 and a temperature that minimizes the risk of heat damage to various components of the exhaust system 110. The desired temperature may be based on a calibration temperature stored in a look-up table in the memory device 135. The controller 115 may select the calibration temperature based on, e.g., an initial operating condition of the engine 105.

At block 410, the controller 115 may identify the calibration threshold temperature range, which may define a range of temperatures that are sufficient to burn the particulate matter off the particulate filter 125 while minimizing the risk of heat damage to components in the exhaust system 110. The controller 115 may select the calibration temperature range from one or more look-up tables stored in the memory device 135 based on, for example, an initial operating condition of the system 100.

At block 415, the controller 115 may identify the present operating condition of the engine 105. If the system 100 is used with a vehicle, the operating condition of the engine 105 may be derived from the speed of the vehicle. The controller 115 may alternatively use the speed of the engine 105 or the amount of torque generated by the engine 105 to determine the operating condition of the engine 105. The vehicle and/or engine speed may be based on one or more signals received from a sensor (not shown) or the engine control unit 145.

At block 420, the controller 115 may identify the mass flow or change in mass flow of the exhaust gas produced by the engine 105. For instance, a mass flow sensor 155 may measure the mass flow at different time intervals and generate a signal representing the mass flow at each time interval. The controller 115 may derive the mass flow or the change in mass flow based on the signals generated by the sensor. Alternatively, the controller 115 may estimate the mass flow or change in mass flow based on signals generated by the engine control unit 145 representing, e.g., the amount of fuel consumed by the engine 105 at each time step.

At block 425, the controller 115 may select an engine condition offset, a mass flow offset, or both. The selected offsets may be based on the operating condition identified at block 415 and/or the mass flow or change in mass flow identified at block 420. Offset values, such as the engine condition offset and the mass flow offset, may be stored in one or more look-up tables in the memory device 135.

At block 430, the controller 115 may apply one or more of the offsets selected at block 425 to the calibration temperature range identified at block 410. As discussed above, the maximum temperature and minimum temperature may be used to define one or more temperature deviation thresholds. The maximum and minimum temperatures may be initially defined based on the calibration (e.g., desired) temperature and the calibration temperature range, discussed above. However, the maximum and minimum temperatures may be redefined in light of the offsets selected at block 425, which would further change the temperature deviation threshold. The offsets may have any positive or negative value, and as such, the controller 115 may increase or decrease the highest and/or lowest temperatures in the calibration temperature range given one or more of the selected offsets. Accordingly, the controller 115 may redefine the maximum temperature and the minimum temperature based on, e.g., the calibration threshold temperature range, the operating condition of the engine 105, and the mass flow or change in mass flow.

At block 435, the controller 115 may calculate one or more temperature deviation thresholds based on the desired temperature from block 405 and the maximum and minimum temperatures determined at block 430. For instance, the controller 115 may identify the difference between the maximum temperature and the desired temperature as the first temperature deviation threshold and the difference between the desired temperature and the minimum temperature as the second temperature deviation threshold. In one possible approach, the first and second temperature deviation thresholds are substantially equal to one another. However, it is possible for the first and second temperature deviation thresholds to have different magnitudes.

While the best modes for carrying out the invention have been described in detail, those familiar with the art to which this invention relates will recognize various alternative designs and embodiments for practicing the invention within the scope of the appended claims.

The invention claimed is:

1. A system for the treatment of exhaust gases, the system comprising:
an internal combustion engine having at least one exhaust port;
an exhaust aftertreatment system fluidly coupled to the at least one exhaust port and configured to accept exhaust gas flow from the engine, wherein the exhaust aftertreatment system includes a particulate filter configured to filter particulate matter from the exhaust gas; and
a controller in communication with at least one of the engine and the exhaust aftertreatment system and configured to determine an actual temperature of the particulate filter during a regeneration process and analyze the actual temperature relative to a temperature deviation threshold, wherein the controller is configured to adjust the temperature deviation threshold in real time based at least in part on an operating condition of the engine;
wherein the operating condition of the engine is based at least in part on a speed of the engine;
wherein the controller is configured to determine a maximum temperature above a desired temperature and a minimum temperature below the desired temperature;
wherein the temperature deviation threshold is defined by one or more of the desired temperature, the maximum temperature, and the minimum temperature.

2. A system as set forth in claim 1, wherein the controller is configured to determine a desired temperature of the particulate filter during the regeneration process.

3. A system as set forth in claim 1, wherein at least one of the maximum temperature and the minimum temperature is based at least in part on one or more of an engine condition offset and a mass flow offset.

4. A system as set forth in claim 1, wherein the controller is configured to identify a fault condition based on the actual temperature relative to the temperature deviation threshold.

5. A system as set forth in claim 1, wherein the controller is configured to determine the operating condition of the engine based at least in part on a speed of a vehicle.

6. A system as set forth in claim 1, further comprising a temperature sensor in communication with the controller and configured to measure the actual temperature of the particulate filter and generate a temperature signal representing the actual temperature; and
wherein the controller is configured to receive the temperature signal from the temperature sensor and determine the actual temperature from the temperature signal.

7. A system as set forth in claim 1, wherein the controller is configured to calculate a deviation temperature defined by a difference between the desired temperature and the actual temperature.

8. A system as set forth in claim 7, wherein the controller is configured to compare the deviation temperature to the temperature deviation threshold and identify a fault condition if the deviation temperature exceeds the temperature deviation threshold.

9. A system as set forth in claim 1, wherein the controller is configured to adjust the temperature deviation threshold in real time based at least in part on a mass flow rate of the exhaust gas.

10. A system as set forth in claim 9, wherein the controller is configured to adjust the temperature deviation threshold based at least in part on a change in the mass flow over time.

11. A system as set forth in claim 9, further comprising an engine control unit in communication with the controller and configured to generate one or more control signals to control operation of the engine; and
wherein the controller is configured to receive at least one of the control signals generated by the engine control unit and determine at least one of the operating condition of the engine and the mass flow rate of the exhaust gas based at least in part on the control signals received.

12. A system for the treatment of exhaust gases, the system comprising:
an internal combustion engine having at least one exhaust port;
an exhaust aftertreatment system fluidly coupled to the at least one exhaust port and configured to accept exhaust gas flow from the engine, wherein the exhaust aftertreatment system includes a particulate filter configured to filter particulate matter from the exhaust gas; and
a controller in communication with at least one of the engine and the exhaust aftertreatment system and configured to determine an actual temperature of the particulate filter during a regeneration process and analyze the actual temperature relative to a temperature deviation threshold, wherein the controller is configured to adjust the temperature deviation threshold in real time based at least in part on an operating condition of the engine and a mass flow rate of the exhaust gas; and
wherein the temperature deviation threshold is based at least in part on a calibration temperature range modified by at least one of an engine condition offset and a mass flow offset.

13. A system as set forth in claim 12, wherein the controller is configured to adjust the temperature deviation threshold based at least in part on a change in the mass flow over time.

14. A system as set forth in claim 12, further comprising an engine control unit in communication with the controller and configured to generate one or more control signals to control operation of the engine; and
wherein the controller is configured to receive at least one of the control signals generated by the engine control unit and determine at least one of the operating condition of the engine and the mass flow rate of the exhaust gas based at least in part on the control signals received.

15. A system for the treatment of exhaust gases, the system comprising:
an internal combustion engine having at least one exhaust port;
an exhaust aftertreatment system fluidly coupled to the at least one exhaust port and configured to accept exhaust gas flow from the engine, wherein the exhaust aftertreatment system includes a particulate filter configured to filter particulate matter from the exhaust gas; and a controller in communication with at least one of the engine and the exhaust aftertreatment system, wherein the controller is configured to:

determine an actual temperature of the particulate filter during a regeneration process and analyze the actual temperature relative to a temperature deviation threshold;

adjust the temperature deviation threshold in real time based at least in part on an operating condition of the engine and a mass flow rate of the exhaust gas;

determine a desired temperature of the particulate filter during the regeneration process; and determine a maximum temperature above the desired temperature and a minimum temperature below the desired temperature, wherein the temperature deviation threshold is defined by one or more of the desired temperature, the maximum temperature, and the minimum temperature.

16. A system as set forth in claim 15, wherein the controller is configured to calculate a deviation temperature defined by a difference between the desired temperature and the actual temperature.

17. A system as set forth in claim 16, wherein the controller is configured to compare the deviation temperature to the temperature deviation threshold and identify a fault condition if the deviation temperature exceeds the temperature deviation threshold.

18. A system as set forth in claim 17, wherein at least one of the maximum temperature and the minimum temperature is based at least in part on one or more of an engine condition offset and a mass flow offset.

* * * * *